United States Patent
Bent et al.

(10) Patent No.: US 11,372,553 B1
(45) Date of Patent: Jun. 28, 2022

(54) SYSTEM AND METHOD TO INCREASE DATA CENTER AVAILABILITY USING RACK-TO-RACK STORAGE LINK CABLE

(71) Applicant: Seagate Technology LLC, Fremont, CA (US)

(72) Inventors: John Michael Bent, Los Alamos, NM (US); Ujjwal Lanjewar, Pune (IN); Kenneth K. Claffey, Fremont, CA (US); Raj Bahadur Das, Redwood City, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/139,087

(22) Filed: Dec. 31, 2020

(51) Int. Cl.
*G06F 12/00* (2006.01)
*G06F 3/06* (2006.01)

(52) U.S. Cl.
CPC .......... *G06F 3/0614* (2013.01); *G06F 3/0646* (2013.01); *G06F 3/0683* (2013.01)

(58) Field of Classification Search
CPC ..... G06F 3/0614; G06F 3/0646; G06F 3/0683
See application file for complete search history.

(56) References Cited

U.S. PATENT DOCUMENTS

| | | | |
|---|---|---|---|
| 5,278,838 A | 1/1994 | Ng et al. | |
| 5,999,712 A | 12/1999 | Moiin et al. | |
| 6,070,249 A | 5/2000 | Lee | |
| 7,134,011 B2 | 11/2006 | Fung | |
| 7,246,268 B2 | 7/2007 | Craig et al. | |
| 7,321,905 B2 | 1/2008 | Hartline et al. | |
| 7,594,134 B1 | 9/2009 | Coatney et al. | |
| 7,734,591 B1 | 6/2010 | Mercier et al. | |
| 8,145,941 B2 | 3/2012 | Jacobson | |
| 8,769,370 B2 | 7/2014 | Murakami | |
| 8,839,028 B1 | 9/2014 | Polia et al. | |
| 8,972,538 B2 | 3/2015 | Adlung et al. | |
| 9,079,562 B2 * | 7/2015 | Bert | G06F 11/2035 |
| 9,658,784 B1 | 5/2017 | Ahmad et al. | |
| 10,025,583 B2 | 7/2018 | Butler et al. | |
| 10,050,850 B2 | 8/2018 | Du et al. | |
| 10,218,789 B2 | 2/2019 | Yang et al. | |
| 10,437,674 B1 | 10/2019 | Sridhara et al. | |
| 10,503,427 B2 | 12/2019 | Botes et al. | |
| 10,585,749 B2 | 3/2020 | Kachare et al. | |
| 10,657,106 B2 | 5/2020 | Xu et al. | |

(Continued)

OTHER PUBLICATIONS

Ford, et al.; "Availability in Globally Distributed Storage Systems", OSDI'10: Proceedings of the 9th USENIX conference on Operating systems design and implementation, Oct. 2010, pp. 61-74; USENIX Association, El Cerrito, California. Published online Oct. 4, 2010. obtained from the internet Jan. 24, 2022, 14 pages. Available online at https://static.googleusercontent.com/media/research.google.com/en//pubs/archive/36737.pdf.

(Continued)

*Primary Examiner* — Shawn X Gu
(74) *Attorney, Agent, or Firm* — Mueting Raasch Group

(57) ABSTRACT

A first data storage rack has a first computing unit coupled to a first plurality of storage drives via a first storage controller. A second data storage rack has a second computing unit coupled to a second plurality of storage drives via a second storage controller. A first rack-to-rack storage link cable couples the first computing unit to the second storage controller such that the first computing unit can provide access to the second plurality of drives in response to a failure that prevents the second computing unit from providing access to the second plurality of drives via a system network.

20 Claims, 5 Drawing Sheets

(56) References Cited

U.S. PATENT DOCUMENTS

| | | |
|---|---|---|
| 2003/0135793 A1 | 7/2003 | Craig et al. |
| 2005/0001641 A1 | 1/2005 | Yoshida et al. |
| 2006/0024030 A1 | 2/2006 | Hwang et al. |
| 2006/0074954 A1 | 4/2006 | Hartline et al. |
| 2006/0080362 A1 | 4/2006 | Wagner et al. |
| 2006/0242540 A1 | 10/2006 | Cherian et al. |
| 2007/0300013 A1 | 12/2007 | Kitamura |
| 2008/0115017 A1 | 5/2008 | Jacobson |
| 2009/0150712 A1 | 6/2009 | Balasubramanian et al. |
| 2010/0235677 A1 | 9/2010 | Wylie et al. |
| 2013/0055049 A1 | 2/2013 | Murakami |
| 2014/0047264 A1 | 2/2014 | Wang et al. |
| 2014/0215147 A1 | 7/2014 | Pan |
| 2016/0292035 A1 | 10/2016 | Alcorn et al. |
| 2019/0050289 A1 | 2/2019 | Kachare et al. |
| 2019/0361606 A1 | 11/2019 | Goker et al. |
| 2020/0004701 A1 | 1/2020 | Subbarao et al. |
| 2020/0019323 A1 | 1/2020 | Zagade et al. |
| 2020/0042388 A1 | 2/2020 | Roberts |
| 2020/0128024 A1 | 4/2020 | Kuramkote et al. |
| 2020/0226166 A1 | 7/2020 | Maybee et al. |
| 2021/0255925 A1 | 8/2021 | Bent et al. |
| 2021/0294497 A1 | 9/2021 | Deguchi et al. |

OTHER PUBLICATIONS

Extended European Search Report in European Application No. 21210321.2, dated May 12, 2022, 8 pages.

\* cited by examiner

SYSTEM AND METHOD TO INCREASE DATA CENTER AVAILABILITY USING RACK-TO-RACK STORAGE LINK CABLE

SUMMARY

The present disclosure is directed to a method, system, and apparatus to increase data center availability using a rack-to-rack storage link cable. In one embodiment, a first data storage rack has a first computing unit coupled to a first plurality of storage drives via a first storage controller. A second data storage rack has a second computing unit coupled to a second plurality of storage drives via a second storage controller. A first rack-to-rack storage link cable couples the first computing unit to the second storage controller such that the first computing unit can provide access to the second plurality of drives in response to a failure that prevents the second computing unit from providing access to the second plurality of drives via a system network.

In another embodiment, a method involves coupling first and second computing units of first and second data storage racks to a system network. The first and second computing units provide access to respective first and second pluralities of drives in first and second data storage racks via the system network. A first failure of the second computing unit is detected that prevents the second computing unit from providing access to the second plurality of drives via the system network. The first computing unit is coupled to the second plurality of drives via a first rack-to-rack storage link cable in response to detecting the first failure. Access to the second plurality of drives via the system network is provided via the first computing unit subsequent to the first failure. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data centers. A data center is a facility (e.g., a building) that houses large number of computer systems and associated components, such as network infrastructure and data storage systems. Many modern data centers, also referred to as cloud data centers, are large-scale computing facilities connected to the public Internet and used for servicing a wide variety of applications, such as cloud storage, cloud compute, Web site hosting, e-commerce, messaging, etc. In this disclosure, embodiments pertain to data storage services within a large-scale data center.

A modern data center may have storage capacity in the hundreds of petabytes. This is often provided as a cloud storage service over the Internet. One advantage of using data centers for cloud storage is that efficiencies of scale can make storage on the data centers much cheaper than maintaining one's own data storage facilities. In addition, data centers can employ state-of-the-art protection for the storage media, ensuring data availability and durability, even in the event of equipment failures.

Generally, availability relates to redundancy in storage nodes and compute nodes such that a backup computer and/or storage device can quickly take the place of a failed unit, often without requiring human intervention. Durability relates to the ability to recover from lost portions of stored data, e.g., due to storage device failure, data corruption, etc. Durability may be improved by the use of redundant data such as parity data and erasure codes. The concept of availability and durability are somewhat related but may be independent in some scenarios. For example, if the central processing unit (CPU) of a single-CPU data storage rack fails, then all of the storage provided by the rack may be unavailable. However the data in this scenario may still safe assuming the CPU failure did not damage the storage devices, thus did not negatively affect durability. For purposes of this disclosure, the term "reliability" may be used to describe both availability and durability.

In embodiments described below, strategies are described that can increase data center storage availability beyond what is provided by existing architectures. These strategies can be used with enhance durability schemes such that data center storage can become more reliable in the face of a number of different failure scenarios. These strategies can be used with known storage architectures such as Lustre, PVFS, BeeGFS, Cloudian, ActiveScale, SwiftStack, Ceph, HDFS, etc.

Figure 1:
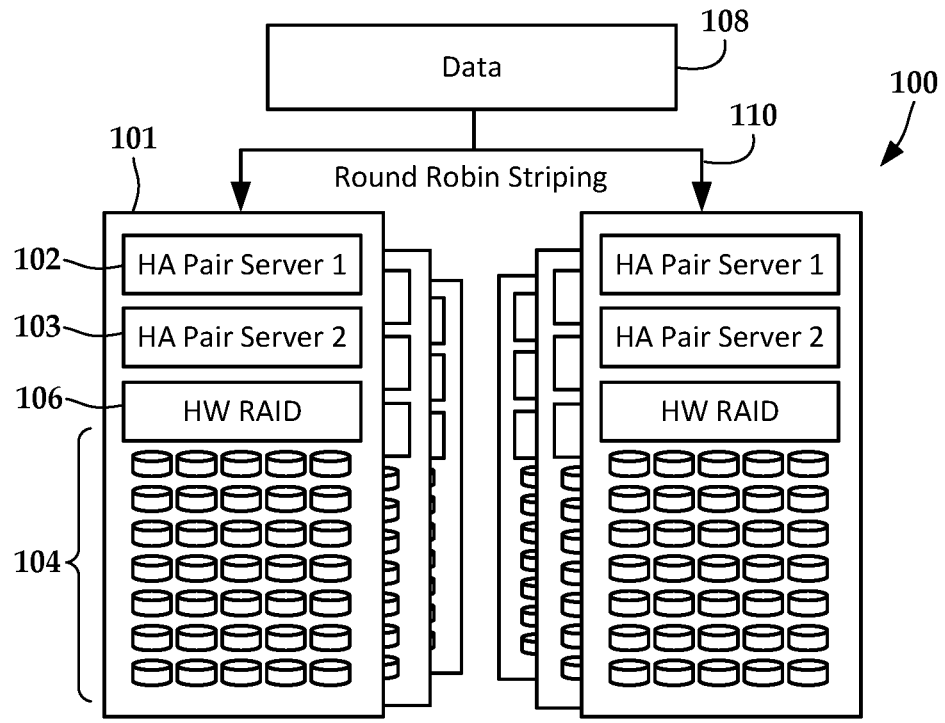
FIGS. 1 and 2 are block diagrams of data center systems according to example embodiments.
Figure 2:
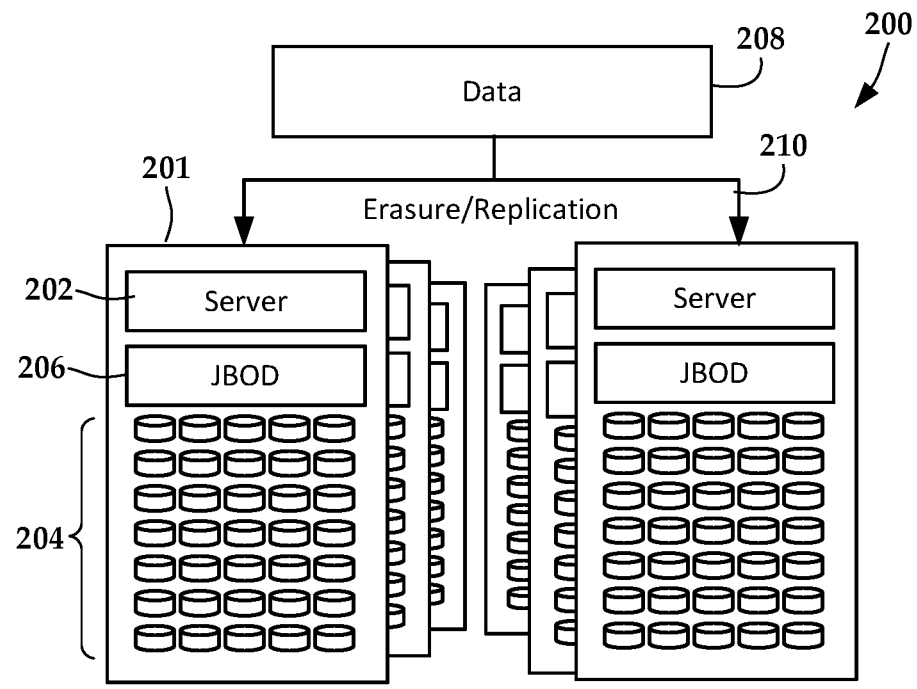

In FIGS. 1 and 2, diagrams illustrate example server architectures that may utilize features according to example embodiments. In FIG. 1, a block diagram shows a number of server storage racks 100 according to a first example embodiment. Rack 101 will be described in further detail, and all of the racks 100 in FIG. 1 may have the same or similar features. Rack 101 is configured as a high-availability (HA) storage server, and utilizes first and second computing units 102 and 103, which are indicated as servers in the drawings. For purposes of this discussion, the term "computing unit" or "server" is meant to indicate an integrated computing device (e.g., board, chassis) with at least one CPU, memory, and input/output (I/O) busses. The computing unit/servers 102, 103 will also have one or more network interface that couples the rack into the data center network.

A number of storage drives 104, e.g., hard disk drives, solid state drives (SSD), are located in the rack 100. Note that the term "drive" in this disclosure is not meant to limit the type or form factor of the storage media, nor is this meant to limit the enclosures and interface circuitry of the drives. The number of storage drives 104 may more than a hundred per rack in some embodiments, and the storage drives 104 are coupled to one or more storage controllers 106. In this example, the storage controller 106 is shown as a redundant array of independent disks (RAID) controller that uses specialized hardware and/or firmware to arrange the storage devices into one or more RAID virtual devices. Generally, this involves selecting drives and/or drive partitions to be assembled into larger virtual storage device, sometimes referred to as a volume. Depending on the type of RAID volume (e.g., RAID 1, RAID 5, RAID 6), redundancy and/or parity may be introduced to increase durability of the volume. Typically, a large data center may use RAID 6, and/or may use proprietary or non-standard schemes (e.g., declustered parity).

The HA computing units 102, 103 are both coupled to the drives in an arrangement that allows the rack to continue operating in the event of a failure of one of the computing units 102, 103. For example, the storage drives 104 may be divided into two sets, each coupled to a different storage controller 106. The first HA computing unit 102 is designated as the primary for a first storage controller 106 and as secondary for the second storage controller 106. The second HA computing unit 103 is designated as the primary for the second storage controller 106 and as secondary for the first storage controller 106. The HA computing units 102, 103 monitor each other's activity to detect a sign of failure. If one of the HA computing units 102, 103 is detected as having failed, the other HA computing unit 102, 103 will take over as primary for the failed unit thus maintaining availability for the entire rack 101. There may be other ways to couple computing units 102, 103 in an HA arrangement, e.g., using a single storage controller 106, more than two storage controllers 106, etc., and this example is presented for purposes of illustration and not limitation.

At a system level, data 108 that is targeted for the storage racks 100 may be distributed between the racks, e.g., using a round-robin striping storage scheme 110. In this scheme 110, a data unit (e.g., file, storage object) is divided into parts that are each stored on different racks. This type of arrangement is used in storage architectures such as Lustre, PVFS, BeeGFS, etc., and may be applicable to file-based storage and object-based storage systems.

In FIG. 2, a block diagram shows a number of server storage racks 200 according to a second example embodiment. Rack 201 will be described in further detail, and all of the racks 200 in FIG. 2 may have the same or similar features. Rack 201 is configured with a single computing unit 202, which is indicated as a server in the drawing. A number of storage drives 204 are located in the rack 201 and coupled to one or more storage controllers 206. In this example, the storage controller 206 is shown as a JBOD (just a bunch of disks) controller, which appends multiple drives together to form a single volume, and typically does not employ local parity or redundancy.

Compared to the arrangement in FIG. 1, the arrangement in FIG. 2 does not have features internal to the racks (e.g., hardware RAID, HA servers) that provide availability and durability. This increases the risk of data loss or unavailability within the racks 200, but does reduce hardware cost and complexity and may be easily scaled. In order to provide the reliability expected of cloud storage, the system in FIG. 2 may utilize what is referred to herein as software reliability, in which the reliability is provided by the network components (e.g., storage middleware) that stores data 208 amongst the racks 200 using erasure codes and replication 210. Generally, this involves the storage middleware dividing data objects into portions that are distributed among multiple racks. The storage middleware also calculates and separately stores redundant portions using erasure codes in others of the racks. The erasure coded data can be used to recover portions lost portions of data due to a drive or rack failure. This type of arrangement is used in storage architectures such as Cloudian, ActiveScale, SwiftStach, Ceph, and HDFS.

Figure 3:
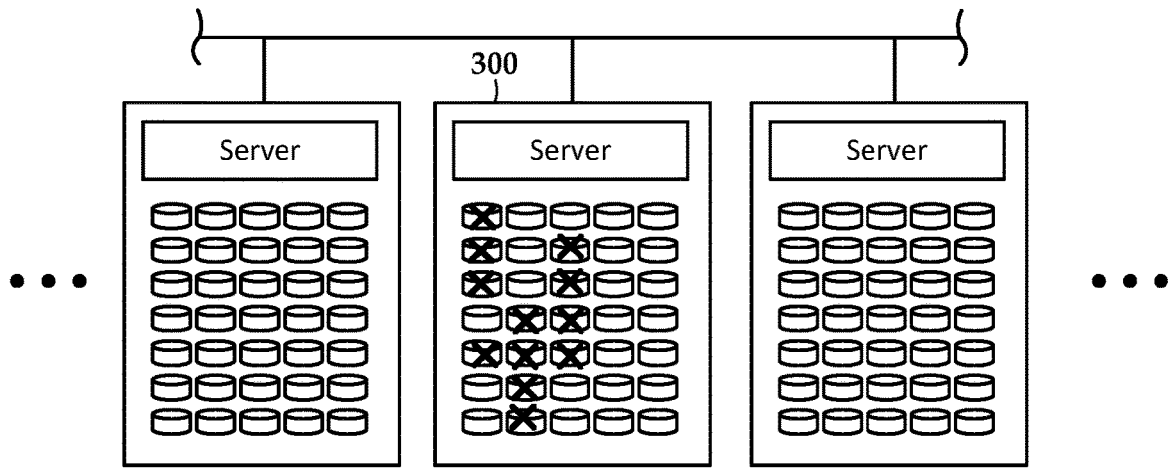
FIGS. 3, 4, and 5 illustrate data system failures that may be encountered by a data center system according to an example embodiment.
Figure 4:
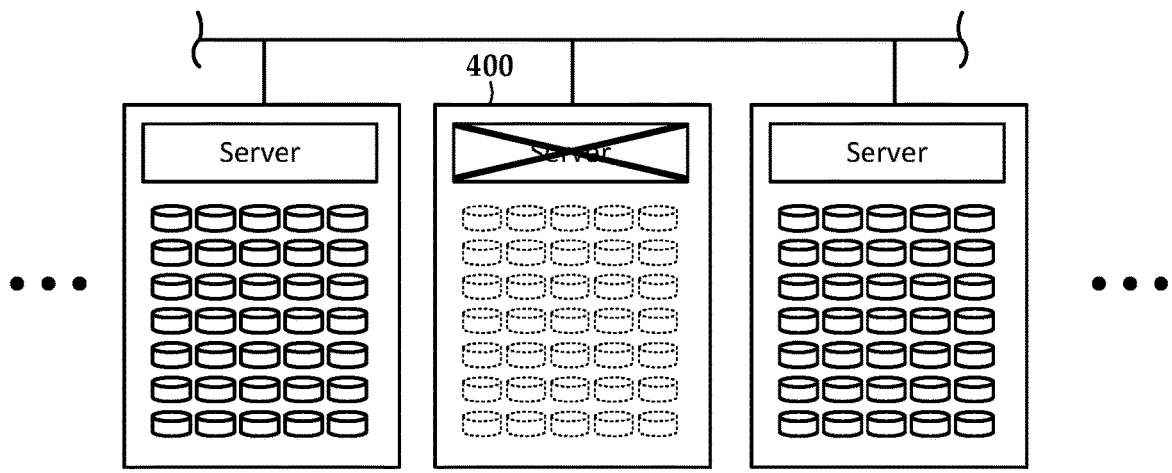

The two different arrangements shown in FIG. 1 and FIG. 2 may have their particular strengths related to reliability, by neither approach can protect against all failure events. In particular two modes of large scale failure may be considered when analyzing reliability of these architectures. The first failure mode is a spatial failure burst, which involves multiple simultaneous drive failures within a single rack. An example of this is shown in FIG. 3, in which the X's indicate failed drives within rack 300. Another example that may also be considered a spatial failure burst is shown in FIG. 4, where a single server has failed in the rack 400. In this example, the data is not necessarily lost but is unavailable. A situation as shown in FIG. 4 could also be caused by some other single point of failure, e.g., power delivery, cooling, storage controller, etc. A spatial failure burst as shown in FIGS. 3 and 4 can be protected against by using erasure across enclosures as in FIG. 2. Parity within enclosure as shown in FIG. 1 may be insufficient to protect against a spatial failure burst, e.g., if enough drives within a RAID volume fail or if all computing units/servers within a rack fail.

Figure 5:
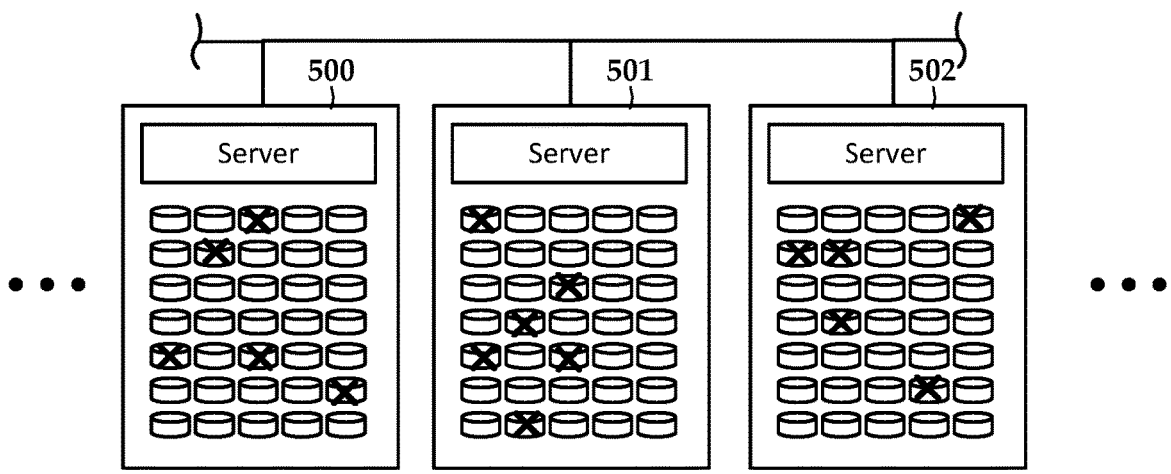

The second form of failure mode is aspatial failure burst, which involves multiple simultaneous drive failures across multiple racks. An example of this is shown in FIG. 5, in which the x's indicate failed drives within storage racks 500-502. An aspatial failure burst can be protected against by employing erasure/parity within storage racks as in FIG. 1, but using erasure across storage racks as shown in FIG. 2 may be insufficient. For example, some software reliability configurations as in FIG. 2 recommend no more than 12 drives per computing unit/server in a setup as shown in FIG. 2. However, 12 drives per enclosure is a small number by today's standards, and this small number reduces the cost efficiency of the data storage units, which is one advantage of this type of architecture. For inexpensive mass storage, it may be desirable to have over 100 drives per computing unit/server in order to achieve cost goals.

Figure 6:
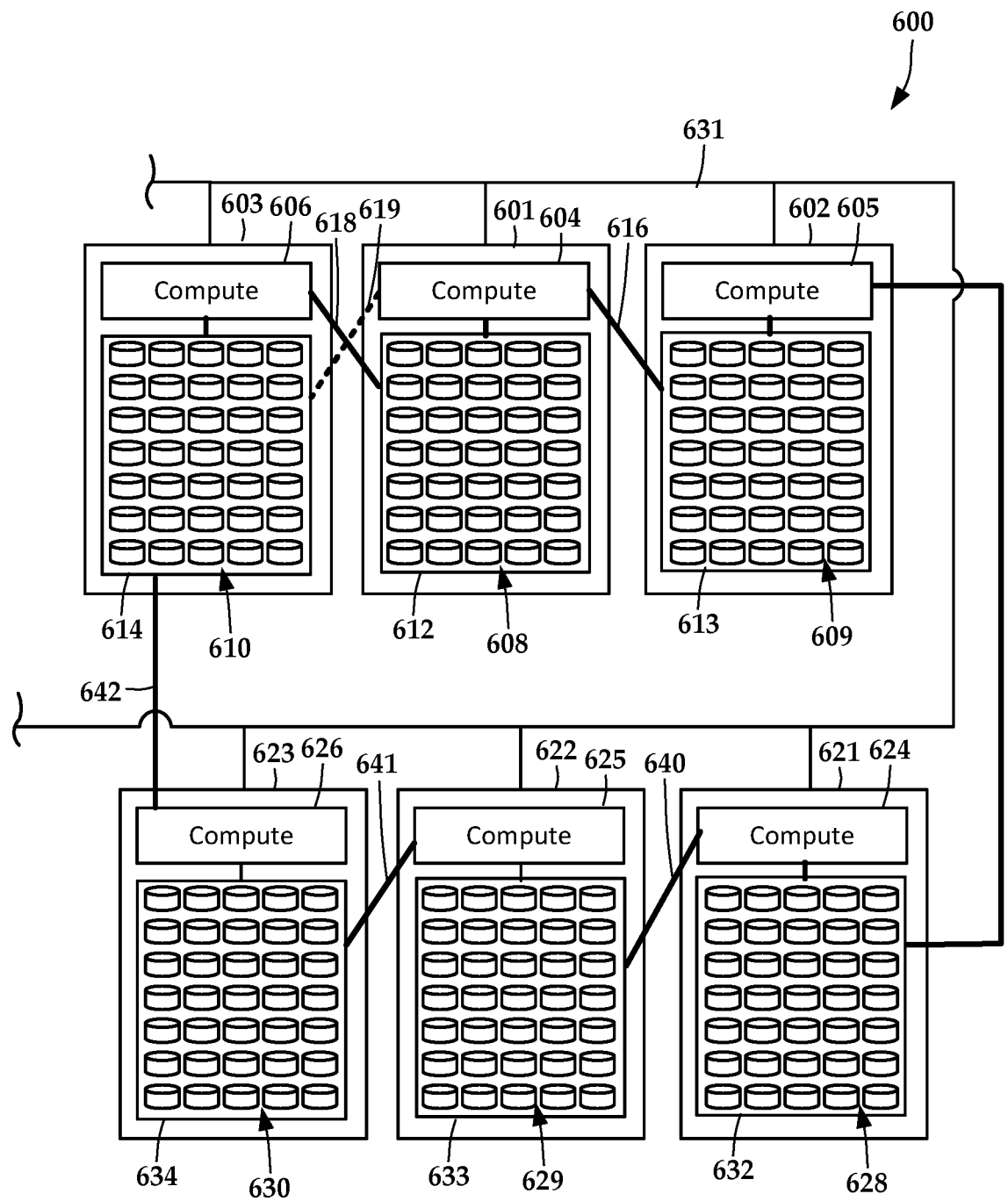
FIG. 6 is a diagram of a data center system according to an example embodiment.

In FIG. 6, a block diagram shows a data center system 600 according to an example embodiment. The system 600 includes first, second and third data storage racks 601, 602, and 603, each respectively having first, second and third computing units 604, 605, and 606 respectively coupled to and providing access to first, second, and third pluralities of storage drives 608, 609, and 610. In this example, the first, second, and third pluralities of storage drives 608-610 are coupled via first, second, and third storage controllers 612, 613, and 614. The computing units 604, 605, and 606 are commonly coupled to a network 631.

A first rack-to-rack storage link cable 616 couples the first computing unit 604 to the second plurality of drives 609 such that the first computing unit 604 can provide access to the second plurality of drives 609 in response to a first failure that prevents the second computing unit 605 from accessing the second plurality of drives 609. A second rack-to-rack storage link cable 618 couples the third computing unit 606 to the first plurality of drives 608 such that the third computing unit 606 can provide access to the first plurality of drives 608 in response to a second failure that prevents the first computing unit 604 from accessing the first plurality of drives 608. Note that the failures described above for the first and second computing units 604, 605 may include a failure of the computing units themselves (e.g., CPU, memory, I/O), the failure of a link between the computing units and the drives and/or storage controllers, a power failure that affects the drives and/or computing units, etc.

The storage link cables 616, 618 may be any type of cable compliant with a point-to-point, storage protocol that can operate from rack-to-rack distances, including SATA, SaS, SCSI, Fibre Channel, Ethernet, etc. Note that an Ethernet cable may be configured to run point-to-point, e.g., without intervening switches, in which case the cable may be configured as a crossover Ethernet cable. Generally, these cables 616, 618 can be distinguished from the network cabling that commonly couples the computing units 604-606 to the system network 631. Because the storage controllers 612-614 may present each drive arrays 608-610 as a single storage device, only one cable 616, 618 may be needed, although more may be used for redundancy, performance, and/or to account for multiple storage controllers as discussed in greater detail below.

Also shown in FIG. 6 are additional data storage racks 621-623 coupled to the network 631, each respectively having computing units 624-626 respectively coupled to and providing access to pluralities of storage drives 628-630 via storage controllers 632-634. Rack-to-rack storage link cables 640-642 couple compute units 624-626 to drive arrays 633, 634, and 614. Thus, in this illustrative example of six data storage racks 601-603, 621-623, each compute unit 604-606, 624-626 has a backup unit while still requiring only one compute unit/server per rack. When a computing unit fails, the disks controlled by that unit can remain available via the backup. Note the primary and backup compute units may not be strictly consider "pairs," as a round-robin HA is enabled here. In this arrangement, each compute unit backs up a neighboring computing unit, and the "last" compute unit 626 backs up the "first" compute unit 606. This round-robin arrangement allows for an odd number group of compute units to provide HA backup for each other.

In other embodiments, the data storage racks 601-603, 621-623 could be coupled as pairs similar to an in-rack HA server. This is indicated by dashed line 619, which represents an optional storage link cable that couples compute unit 604 to disks 610. The optional storage link cable 619 could be used with storage link cable 618 that provides backup to disks 608, and optional storage link cable 619 could also be used instead of or in addition to storage link cable 616. In other embodiments, backup groups within a plurality of racks could be formed such that racks within each group back each other up independently of other groups, which could help limit the length of storage link cable runs. For example, a set of 24 racks could be divided into four groups of six racks, the six racks in each group arranged in a round-robin backup arrangement as shown in FIG. 6.

Figure 7:
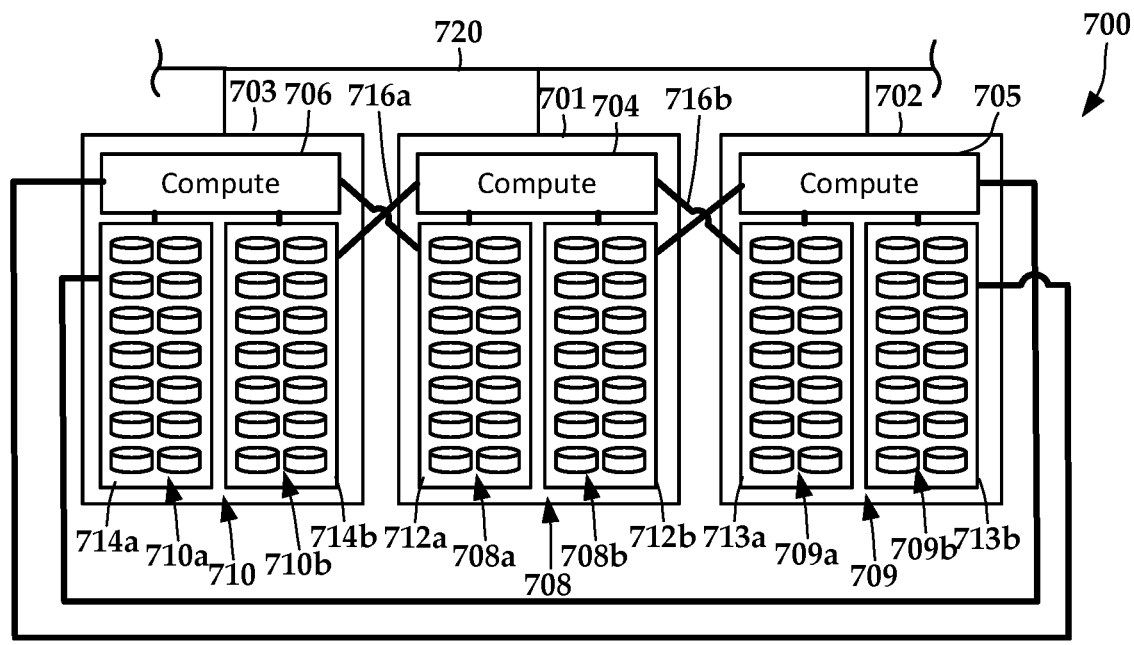
FIG. 7 is a diagram of a data center system according to another example embodiment.

In FIG. 7, a block diagram shows a data center system 700 according to an example embodiment. The system 700 includes first, second and third data storage racks 701, 702, and 703, each respectively having first, second and third computing units 704, 705, and 706. The computing units 704, 705, and 706 are commonly coupled to a network 720. The first computing unit 701 is coupled to and provides access to portions 708a, 708b of storage drives 708, the portions 708a, 708b being coupled to the first computing unit 704 by storage controllers 712a, 712b. The second computing unit 705 is coupled to and provides access to portions 709a, 709b of storage drives 709, the portions 709a, 709b being coupled to the first computing unit 705 by storage controllers 713a, 713b. The third computing unit 706 is coupled to and provides access to portions 710a, 710b of storage drives 710, the portions 710a, 710b being coupled to the first computing unit 706 by storage controllers 714a, 714b.

Each computing unit 704-706 has two rack-to-rack storage link cables extending to drive array portions of two different racks, where the compute unit acts as a backup. For example, compute unit 704 has rack-to-rack storage link cable 716a that is coupled to drive portion 714b of rack 703 and rack-to-rack storage link cable 716b that is coupled to drive portion 713a of rack 702. This pattern is repeated for the other computing units 705, 706 and also forms a round-robin coupling such that this backup arrangement can be used for odd numbers of racks. Note that this arrangement, while doubling the number of rack-to-rack cables per rack compared to the arrangement in FIG. 6, can also distribute the load of a failed computing unit to multiple other computing units. For example, if the first computing unit 704 fails, portion 712a will be made available on the network 720 via the third computing unit 706 and portion 712b will be made available on the network 720 via the second computing unit 706.

Figure 8:
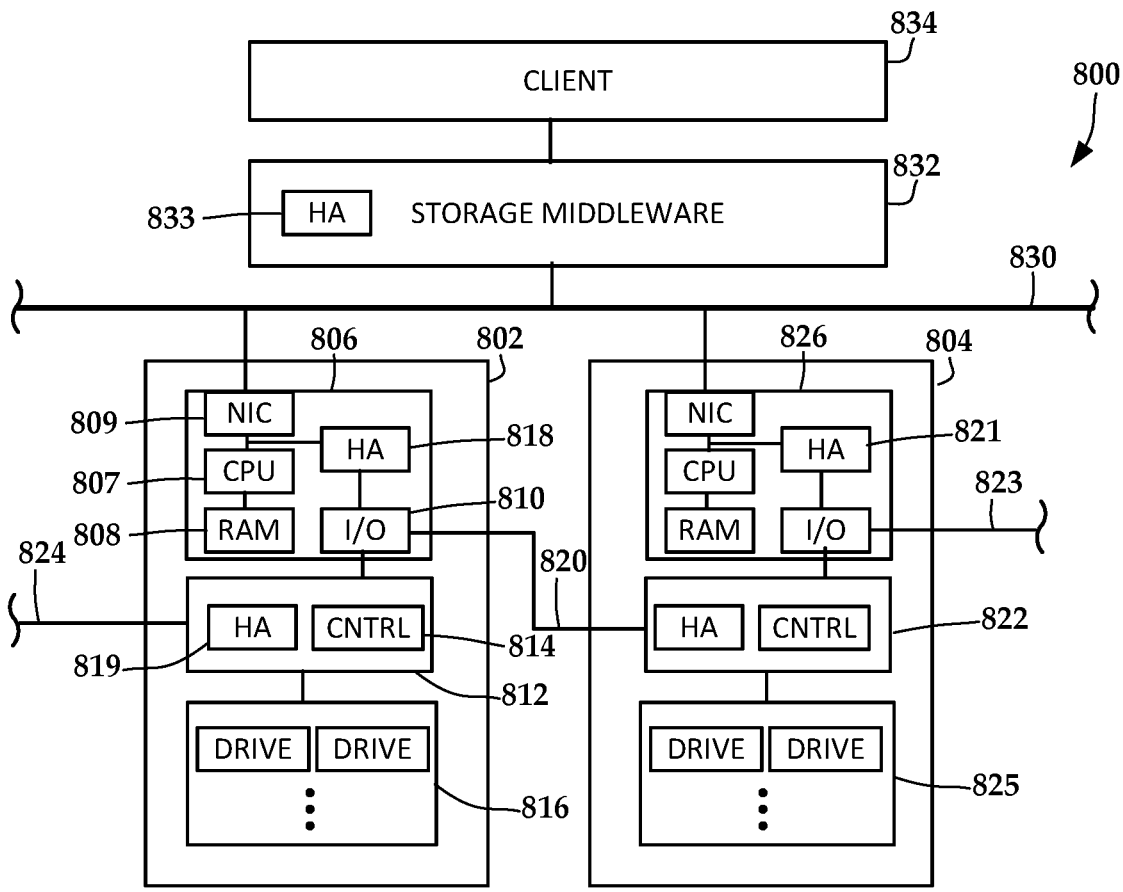
FIG. 8 is a block diagram showing functional components of a system and apparatus according to an example embodiment.

In FIG. 8, a block diagram shows internal components of racks 802, 804 in a system 800 according to an example embodiment. Components of rack 802 will be described in greater details, and other racks in the system 800 may be similarly or identically configured. Rack 802 includes a server/compute unit 806 with at least one CPU 807, random access memory (RAM) 808, a network interface card (NIC) 809, and an I/O interface 810. These components of the compute unit 806 may be coupled via a motherboard or other circuitry known in the art.

The I/O interface 810 is coupled to a storage controller 812 that includes its own controller circuitry 814, e.g., a system-on-a-chip (SoC) that governs operations of the controller. Those operations include the control of a drive array 816, which includes a plurality of persistent storage devices (e.g., HDD, SSD) that may be coupled to one or more circuit boards (e.g., backplanes) and may be arranged into storage pods. The rack 802 may include multiple instances of the drive array 816 and/or storage controllers 812.

The compute unit 806 and/or storage controller 812 may include HA control modules 818, 819 that enable the components of the rack 802 to act as a storage control backup for one or more other racks via storage link cable 820. One or both of HA control modules 818, 819 can further enable one or more other racks to act as a storage control backup for rack 802 via storage link cable 824.

Another backup cable 823 is also shown, and may provide similar backup functions for other racks that are not shown in this figure. For example, additional data storage racks can each be serially coupled by respective rack-to-rack storage link cables that are serially coupled by respective rack-to-rack storage link cables. A computing unit of each rack can provide access to a next plurality of disk drives of a next rack in response to a failure that prevents the next computing unit of the next rack. In such a case, cable 823 provides backup for drives of a first of these additional racks, and a last computing unit of these additional data storage racks provides backup for drives 816 via data link cable 824. In another arrangement, if data link cables 823, 824 are joined together, this would be a pair-wise backup arrangement.

The HA control modules 818, 819 may allow for self-healing of the storage racks, such that a centralized entity (e.g., storage middleware 832) does not necessarily need to detect failures and assign backup servers. For example, the HA module 818 may communicate with an associated HA module 821 on rack 804, e.g., via a system network 830.

These communications may include keep-alive-type messages that determine whether the computing unit 826 of the rack 804 is operational. Similar communications may be performed through HA modules on storage controllers 812, 822 to see if the storage controller 822 is operational. If it is determined that the computing unit 826 is non-responsive but storage controller 822 is responsive, then the computing unit 806 can take control of the controller 822 and its associated disk array 825. This may also involve the system controller 822 severing any links with the computing unit 826 to prevent any conflict should the computing unit 826 later come back online.

Note that in order for the computing unit 806 to take over for the failed computing unit 826, it may be configured to act as a network proxy for the failed unit. For example, if the computing units 806, 826 have network hostnames "rack802" and "rack804," they may provide access to the arrays 816, 825 via network file system (NFS) uniform resource locators (URLs) "nfs://rack802:/<UUID1>" and "nfs://rack804:/<UUID2>," where UUID1 and UUID2 represents universally unique identifiers (UUIDs) provided by respective storage controllers 812, 822 to identify their storage arrays 816, 825.

If computing unit 826 has failed, then the hostname "rack804" would presumably not respond to network requests. Therefore, the computing unit 806 could be configured to also use the hostname "rack804," e.g., by reconfiguring a domain name server (DNS) of the network 830 to point the "rack804" hostname to the Internet Protocol (IP) address of the computing unit 806. Because UUIDs are used to identify the respective arrays 816, 825 in the URLs, the backup computing unit 806 could seamlessly take over network requests on behalf of failed unit 826. Note that if the computing unit 826 later came back online in this scenario there should be no confusion on the network due to the NFS remapping, as the computing unit 826 would typically not rely on its network hostname for internal network operations, as it would instead "localhost" or the loopback IP address.

In other embodiments, the aspects related to detecting failed compute units and assigning backups may be instead coordinated by a network entity such as the storage middleware 832. Generally, the storage middleware 832 acts as a single, generic, storage interface used by clients 834 to access the storage services of the data center. The storage middleware 832 may run on any number of computing nodes in the data center, including one or more dedicated compute nodes, as a distributed service, on the client 834, on one or more of the storage rack computing units, etc. The storage middleware 832 can be optimized for different types of storage access scenarios encountered by large data centers, e.g., to optimize aspects such as data throughput, latency, reliability, etc. In this case, the storage middleware 832 may include its own HA module 833 that communicates with the HA modules on the racks, e.g., one or both of HA modules 818, 819.

The activities of the middleware HA module 833, may be similar to that described in the self-healing example described above, e.g., keep-alive messages, remapping of network shares. Similar to the example of the backup of NFS volumes described above, the middleware HA module 833 could detect failure of hostname "rack804." However, as the storage middleware 832 may abstract all access to the storage on behalf of the clients, it could change its internal mapping to account for the switch in backup units, e.g., nfs://rack804:/<UUID2> is changed to nfs://rack802:/<UUID2>. This may also be accompanied by a message to the HA module 818 of rack 802 to assume control of array 825 via cable 820.

Note that managing backup operations via the middleware HA module 833 may still involve some peer-to-peer communications via components of the storage racks. For example, even if the middleware HA module 833 coordinates the remapping of network requests to the backup computing unit 806, the HA module 818 of the backup computing unit 806 may still communicate to the controller card 822 to take over the host storage interface for subsequent storage operations, and further to sever the host interface with the failed computing unit 826 in case the latter comes back online. Note that if the failed computing unit 826 does come back online and appears to be fully operational again, then the backup operations can be reversed to switch control of the drive array 825 from computing unit 806 back to the computing unit 826.

In the embodiments described above, any type of local or system level data durability schemes may be used in the increased availability between data storage racks using storage link cables. As previously noted, one scheme involves using RAID parity, such that RAID volumes are protected against failures within drives that form the volume. Another scheme involves dividing the data into portions, calculating erasure code data for the portions, and distributing the portions and erasure code data between different storage units (e.g., storage racks).

Another durability scheme that can be used together with the illustrated schemes for increased availability between data storage racks is a hybrid scheme, which uses both RAID parity and system-level erasure. For example, the system could be designed with n % data overhead for redundancy, and a first amount of $n_1$% of the overhead can be dedicated to RAID parity, and a second amount $n_2$% of the overhead that can be dedicated to erasure, where $n_1+n_2=n$. This can make the system more robust against data loss in some of the failure scenarios shown in FIGS. 3-5. More details of this hybrid durability scheme are described in U.S. patent application Ser. No. 16/794,951 on Feb. 19, 2020, entitled "Multi-Level Erasure System with Cooperative Optimization," which is hereby incorporated by reference in its entirety.

Figure 9:
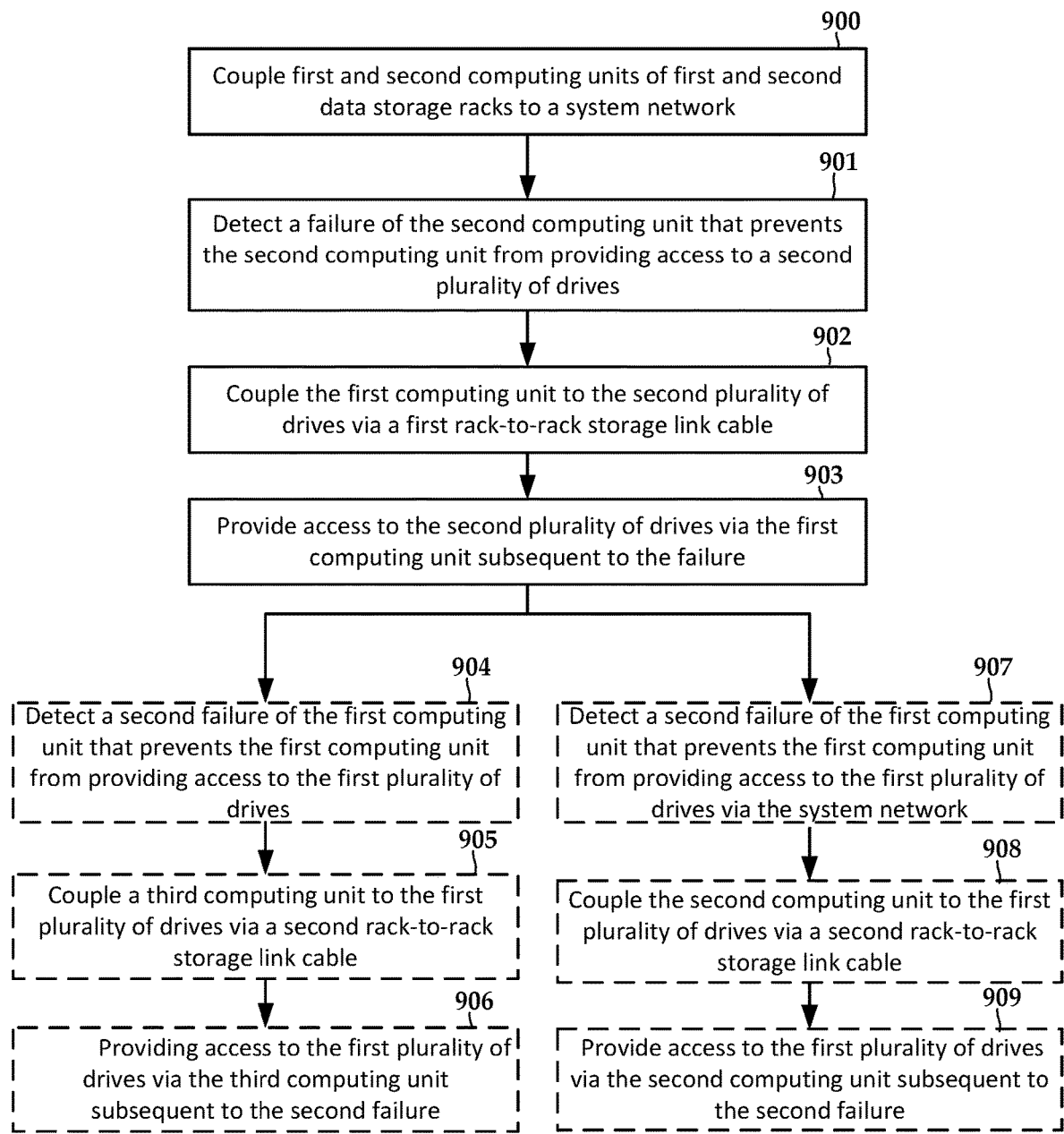
FIG. 9 is a flowchart of a method according to an example embodiment.

In FIG. 9, a flowchart illustrates a method according to an example embodiment. The method involves coupling 900 first and second computing units of first and second data storage racks to a system network. The first and second computing units provide access to via the system network to respective first and second pluralities of drives in first and second data storage racks. For example, each plurality of drives may be coupled to a respective storage controller, which presents the drives as a reduced number of virtual devices (e.g., RAID or JBOD volumes) to the computing units.

A failure of the second computing unit is detected 901 that prevents the second computing unit from providing access to the second plurality of drives via the system network. In response to detecting the failure, the first computing unit is coupled 902 to the second plurality of drives via a first rack-to-rack storage link cable. Note that for this and other instances of coupling, the storage link cable may already be physically connected between respective computing unit and drives of the first and second racks. Thus the coupling indicated in this figure generally involves electrical and logical coupling between units that are already physically connected by a storage link cable. Access to the second plurality of drives is provided 903 via the first computing unit subsequent to the first failure.

Also shown in FIG. 9 are optional steps that can be performed by a system to protect the disks of the first data storage rack. As indicated by steps 904-906, one way to do this is to use a round-robin type connection as described above. This may involve detecting 904 a second failure of the first computing unit that prevents the first computing unit from providing access to the first plurality of drives via the system network. A third computing unit is coupled 905 to the first plurality of drives via a second rack-to-rack storage link cable in response to detecting the second failure. The third computing unit provides access to via the system network to a third plurality of drives in a third data storage rack. Access to the first plurality of drives is provided 906 via the third computing unit subsequent to the second failure.

Another way to protect the disks of the first data storage rack is a pair-wise backup as indicated by steps 907-909. This may involve detecting 907 a second failure of the first computing unit that prevents the first computing unit from providing access to the first plurality of drives via the system network. The second computing unit is coupled 908 to the first plurality of drives via a second rack-to-rack storage link cable in response to detecting the second failure. Access to the first plurality of drives is provided 909 via the second computing unit subsequent to the second failure.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A system, comprising:
 a first data storage rack comprising a first computing unit coupled to a first plurality of storage drives via a first storage controller;
 a second data storage rack comprising a second computing unit coupled to a second plurality of storage drives via a second storage controller; and
 a first rack-to-rack storage link cable coupling the first computing unit to the second storage controller such that the first computing unit can provide access to the second plurality of drives via the second storage controller in response to a first failure that prevents the second computing unit from providing access to the second plurality of drives via a system network.

2. The system of claim 1; further comprising:
 a third data storage rack comprising a third computing unit coupled to a third plurality of storage drives via a third storage controller; and
 a second rack-to-rack storage link cable coupling the third computing unit to the first storage controller such that the third computing unit can provide access to the first plurality of drives in response to a second failure that prevents the first computing unit from accessing the first plurality of drives.

3. The system of claim 2, further comprising a third rack-to-rack storage link cable coupling the second computing unit to the third storage controller such that the second computing unit can provide access to the third plurality of drives in response to a third failure that prevents the third computing unit from accessing the third plurality of drives.

4. The system of claim 1, further comprising:
 two or more additional data storage racks each that are serially coupled by respective rack-to-rack storage link cables such that for each rack, a computing unit of each rack can provide access to a next plurality of drives of a next rack in response to a failure that prevents a next computing unit of the next rack providing access to the next plurality of drives; and
 a second rack-to-rack storage link cable coupling a last computing unit of a last of the two or more additional storage racks to the first storage controller such that the last computing unit can provide access to the first plurality of drives in response to a second failure that prevents the first computing unit from accessing the first plurality of drives.

5. The system of claim 1, further comprising a second rack-to-rack storage link cable coupling the second computing unit to the first storage controller such that the second computing unit can provide access to the first plurality of drives in response to a second failure that prevents the first computing unit from accessing the first plurality of drives.

6. The system of claim 1, wherein the first computing unit is operable to detect the first failure and provide access to the second plurality of drives via the system network in response thereto.

7. The system of claim 1, further comprising storage middleware coupled to the first and second computing units via the system network, the storage middleware operable to detect the first failure and instruct the first computing unit to provide access to the second plurality of drives via the system network in response thereto.

8. The system of claim 1, wherein the first rack-to-rack storage link cable comprises one of an SaS cable, SATA cable, SCSI cable, Fibre Channel cable, or point-to-point Ethernet cable.

9. A method, comprising:
 coupling first and second computing units of first and second data storage racks to a system network, the first and second computing units providing access via the system network to respective first and second pluralities of drives in first and second data storage racks, the first computing unit coupled to the first plurality of drives via a first storage controller and the second computing unit coupled to the second plurality of drives via a second storage controller;

detecting a first failure of the second computing unit that prevents the second computing unit from providing access to the second plurality of drives via the system network;

coupling the first computing unit to the second plurality of drives via a first rack-to-rack storage link cable in response to detecting the first failure, the first rack-to-rack storage link cable coupling the first computing unit to the second storage controller; and providing access to the second plurality of drives via the first computing unit and the second storage controller subsequent to the first failure.

10. The method of claim 9, further comprising:

detecting a second failure of the first computing unit that prevents the first computing unit from providing access to the first plurality of drives via the system network;

coupling a third computing unit to the first plurality of drives via a second rack-to-rack storage link cable in response to detecting the second failure, the third computing unit providing access to via the system network to a third plurality of drives in a third data storage rack; and providing access to the first plurality of drives via the third computing unit subsequent to the second failure.

11. The method of claim 10, further comprising:

detecting a third failure of the third computing unit that prevents the third computing unit from providing access to the third plurality of drives via the system network;

coupling the second computing unit to the third plurality of drives via a third rack-to-rack storage link cable in response to detecting the third failure; and providing access to the third plurality of drives via the second computing unit subsequent to the third failure.

12. The method of claim 9, further comprising:

serially coupling two or more additional data storage racks by respective rack-to-rack storage link cables such that for each rack, a computing unit of each rack can provide access to a next plurality of drives of a next rack in response to a failure that prevents a next computing unit of the next rack providing access to the next plurality of drives; and coupling a second rack-to-rack storage link cable from a last computing unit of a last of the two or more additional storage racks to the first plurality of drives such that the last computing unit can provide access to the first plurality of drives in response to a second failure that prevents the first computing unit from accessing the first plurality of drives.

13. The method of claim 9, further comprising:

detecting a second failure of the first computing unit that prevents the first computing unit from providing access to the first plurality of drives via the system network;

coupling the second computing unit to the first plurality of drives via a second rack-to-rack storage link cable in response to detecting the second failure; and providing access to the first plurality of drives via the second computing unit subsequent to the second failure.

14. The method of claim 9, wherein the first failure is detected by the first computing unit and the first computing unit provides access to the second plurality of drives via the system network in response thereto.

15. The method of claim 9, wherein a storage middleware coupled to the first and second computing units via the system network detects the first failure and instructs the first computing unit to provide access to the second plurality of drives via the system network in response thereto.

16. A system, comprising:

first, second and third data storage racks, each respectively comprising first, second and third computing units respectively coupled to and providing access to first, second, and third pluralities of storage drives via respective first, second, and third storage controllers;

a first rack-to-rack storage link cable coupling the first computing unit to the second storage controller such that the first computing unit can provide access to the second plurality of drives via a system network and the second storage in response to a first failure that disables the second computing unit; and a second rack-to-rack storage link cable coupling the third computing unit to the first storage controller such that the third computing unit can provide access to the first plurality of drives via the system network and the third storage controller in response to a second failure that disables the first computing unit.

17. The system of claim 16, further comprising storage middleware coupled to the first, second and third computing units, the storage middleware operable to perform one or both of:

detecting the first failure and instruct the first computing unit to provide access to the second plurality of drives via the system network in response thereto; and detecting the second failure and instruct the third computing unit to provide access to the first plurality of drives via the system network in response thereto.

18. The system of claim 16, wherein the first computing unit is operable to detect the first failure and provide access to the second plurality of drives via the system network in response thereto, and the third computing unit is operable to detect the second failure and provide access to the first plurality of drives via the system network in response thereto.

19. The system of claim 16, wherein the first rack-to-rack storage link cable couples the first computing; unit to a first portion of the second plurality of drives such that the first computing unit can provide access to the first portion of the second plurality of drives in response to the first failure, the system further comprising:

a fourth data storage rack with a fourth computing unit; and a third rack-to-rack storage link cable coupling the fourth computing unit to a second portion of the second plurality of drives such that the fourth computing unit can provide access to the second portion of the second plurality of drives in response to the first failure.

20. The system of claim 16, wherein the first and second rack-to-rack storage link cables each comprise one of an SaS cable, SATA cable, SCSI cable, Fibre Channel cable, or point-to-point Ethernet cable.

* * * * *

UNITED STATES PATENT AND TRADEMARK OFFICE
CERTIFICATE OF CORRECTION

PATENT NO. : 11,372,553 B1
APPLICATION NO. : 17/139087
DATED : June 28, 2022
INVENTOR(S) : John Michael Bent et al.

It is certified that error appears in the above-identified patent and that said Letters Patent is hereby corrected as shown below:

In the Claims

Column 10 In Claim 2 Line 11, 'claim 1;' should be -- claim 1, --.

Column 12 In Claim 16 Line 12, "and providing access to" should be deleted.

Column 12 In Claim 16 Line 18, 'storage' should be -- storage controller --.

Column 12 In Claim 19 Line 43, 'computing;' should be -- computing --.

Signed and Sealed this
Eighteenth Day of April, 2023

Katherine Kelly Vidal
*Director of the United States Patent and Trademark Office*